US010994799B1

(12) United States Patent
Zaehnle

(10) Patent No.: US 10,994,799 B1
(45) Date of Patent: May 4, 2021

(54) SIDE LOADING LOW FORCE CLUTCH LEVER FOR MOTORCYCLES

(71) Applicant: Arthur Zaehnle, Redding, CA (US)

(72) Inventor: Arthur Zaehnle, Redding, CA (US)

( * ) Notice: Subject to any disclaimer, the term of this patent is extended or adjusted under 35 U.S.C. 154(b) by 0 days.

(21) Appl. No.: 16/683,602

(22) Filed: Nov. 14, 2019

Related U.S. Application Data

(60) Provisional application No. 62/767,723, filed on Nov. 15, 2018.

(51) Int. Cl.
*B62K 23/06* (2006.01)
*B62M 25/04* (2006.01)
*G05G 1/04* (2006.01)

(52) U.S. Cl.
CPC .......... *B62K 23/06* (2013.01); *B62M 25/04* (2013.01); *G05G 1/04* (2013.01)

(58) Field of Classification Search
CPC .......... G05G 1/04; B62M 25/04; B62K 23/06
See application file for complete search history.

(56) References Cited

U.S. PATENT DOCUMENTS

| 5,448,927 A | * | 9/1995 | Lumpkin | ............... B62K 23/06 74/489 |
| 5,660,082 A | * | 8/1997 | Hsieh | ........................ B62L 3/02 74/489 |

FOREIGN PATENT DOCUMENTS

| FR | 665061 A | * | 9/1929 | ............ B62M 25/04 |
| FR | 1141954 A | * | 9/1957 | ................ B62L 3/02 |

* cited by examiner

*Primary Examiner* — Thomas C Diaz
(74) *Attorney, Agent, or Firm* — Heisler & Associates

(57) ABSTRACT

The clutch lever includes a pivot at a proximal end which pivots relative to a mounting bracket and has an arm extending distally from the proximal end. An anchor recess is provided adjacent to the pivot at the proximal end. A post extends from an inner wall of the anchor recess. A clutch cable with a head at a distal end, and with a hole in the head, can fit within the anchor recess with the post passing through the hole in the head. The post and sidewalls thus support the clutch cable relative to the clutch lever. A cap encloses the anchor recess with a depression on an inner face thereof, sized to receive and support a tip of the post therein. The post is thus securely supported at both a base and a tip of the post.

19 Claims, 5 Drawing Sheets

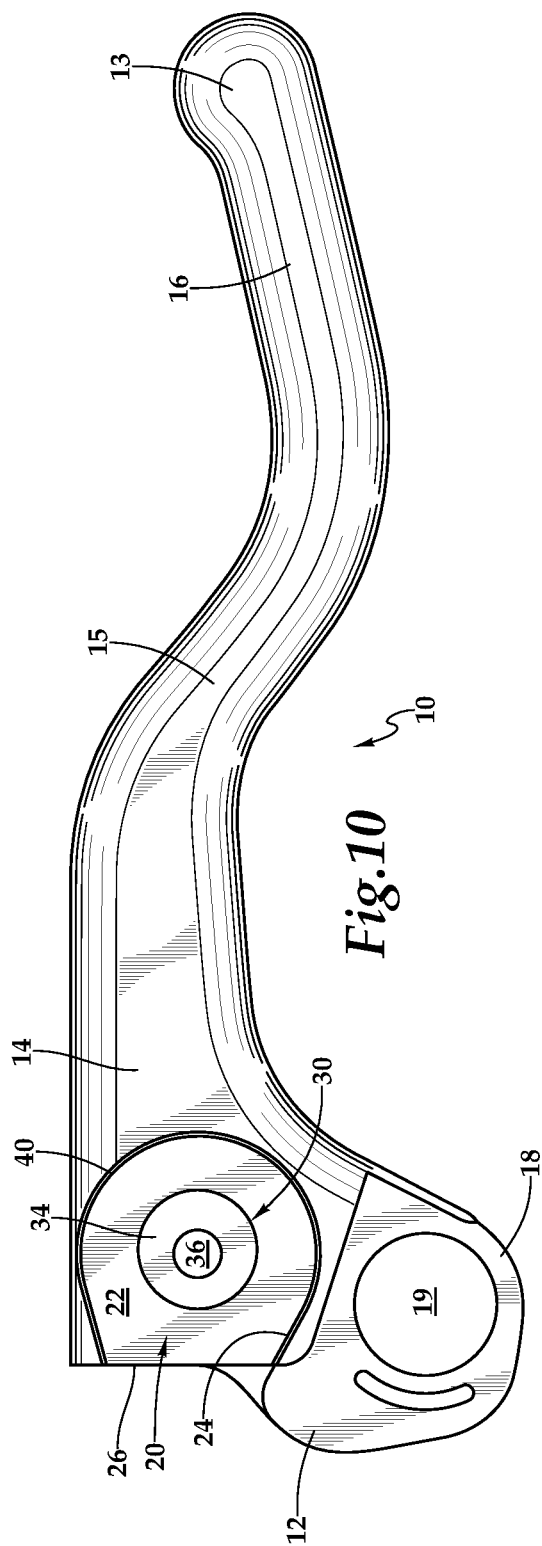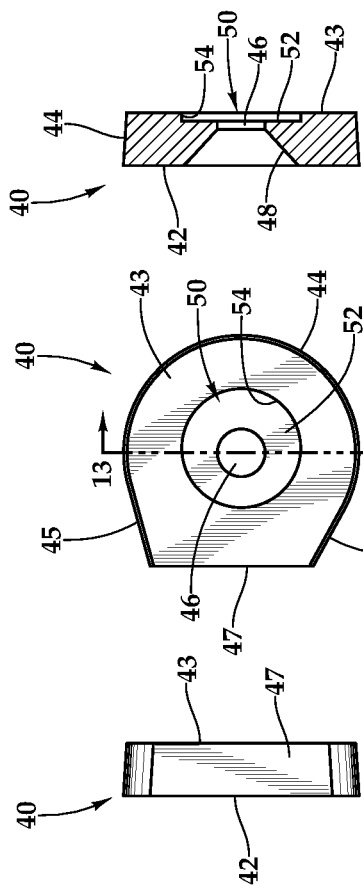

SIDE LOADING LOW FORCE CLUTCH LEVER FOR MOTORCYCLES

CROSS-REFERENCE TO RELATED APPLICATIONS

This application claims benefit under Title 35, United States Code § 119(e) of U.S. Provisional Application No. 62/767,723 filed on Nov. 15, 2018.

FIELD OF THE INVENTION

The following invention relates to clutch levers for actuating a clutch on a motorcycle. More particularly, this invention relates to clutch levers which are easy to toggle, even on motorcycles which require a large amount of tension force to be applied to move a clutch cable thereof, and which securely support the clutch cable relative to the clutch lever, especially when the clutch lever provides a large mechanical advantage to assist a rider in actuating the clutch lever.

BACKGROUND OF THE INVENTION

Clutch levers on motorcycles are a common element which has a somewhat standardized function between most motorcycle makes and models, so that motorcycle riders can have an at least somewhat familiar experience when riding a motorcycle type for the first time. The clutch lever is adjacent to one of the handlebars so that fingers of the rider can simultaneously hold the handlebar with a thumb and palm thereof, while fingers of the rider can reach over an arm of the clutch lever to pivot the clutch lever when desired. The clutch is engaged so that drive is provided between the motor and the drive wheel through a gear box, when the clutch lever is in a relaxed state most distant from the handlebar. When fingers of the rider pull the clutch lever toward the handlebar, the clutch is disengaged and gears within the transmission can be shifted, before releasing the clutch lever to reengage drive between the motor and the output wheel, through the transmission and the newly selected gears.

A common configuration for a clutch lever is to include a pivot hole which aligns with a pivot pin held by a mounting bracket which is secured to the handlebar. The clutch lever pivots about this pivot hole and pivot pin combination. A clutch cable connects to a proximal end of the clutch lever with a relatively small offset distance between where the clutch cable attaches to the clutch lever and the location of the pivot hole. This offset distance is actually carefully selected, to provide a desired amount of tension on the clutch cable responsive to amount of force applied to the clutch lever.

While different goals might be met by adjusting this offset distance in different ways, in some instances it is desirable that a relatively small clutch lever pivoting force, even applied with just one or two fingers of a rider, can produce a relatively high tension force in the clutch cable, for effectively disengaging the clutch so that gears can be shifted. One way to achieve such a goal is to shorten this offset distance between the pivot hole and where the clutch cable attaches to the clutch lever. As one example, if a user applies one pound of force on the clutch lever at a location four inches away from the pivot hole of the clutch lever, and if an offset distance between the clutch cable and the pivot hole is 0.4 inches, the tension in the clutch cable would be ten pounds of tension. Other design factors to accommodate include ensuring that the clutch cable has a required amount of travel, so that the clutch can be fully disengaged and engaged when the clutch lever is depressed and released.

Replacing and adjusting clutch levers typically involves a process of removing the clutch cable from the clutch lever early in the process, and replacing the clutch cable and reconnecting it back to the clutch lever proximal end at an end of such a clutch lever replacement or adjusting procedure. One common configuration for a clutch lever is to include a head at an end of the clutch lever which fits through a slot in an upper portion of a bracket which supports the clutch cable, and then to have this head fit into a recess in the proximal end of the clutch lever. It can be difficult to fit the head of the clutch lever through this slot and into this recess, due to the high forces of tension required to get needed slack in the clutch cable. This can be especially difficult if the clutch is designed to require a low amount of travel in the clutch cable, which can correspond with a short offset distance between the pivot hole and where the clutch cable attaches to the clutch lever. One sub-optimal solution to this problem is to merely increase the offset distance somewhat and require that a user apply greater force to the clutch lever to affectively disengage the clutch.

Depending on how details of the clutch lever are modified to provide an optimal solution, different forces can be required upon different portions of the clutch lever for actuation of the clutch. If the clutch lever is made of aluminum or other relatively weak materials, the geometry can be insufficient for the design and a maximum load can be exceeded, causing the clutch lever to exceed its strength limit when in use and fail, at least partially. Accordingly, a need exists for unique designs which can provide optimal performance, including ease of moving of the clutch lever when in use, and ease in replacing and/or adjusting the clutch lever, while having a clutch lever maintain robust and reliable performance, even if formed of aluminum or other materials weaker than steel.

SUMMARY OF THE INVENTION

With this invention, a clutch lever and associated mounting bracket are provided in a modified form to allow for adjustment and/or replacement of a clutch lever in a simple manner, and to allow for a clutch lever to be modified to facilitate very small input forces, by as little as one finger of the user to be able to apply tension force to a clutch cable needed to disengage the clutch and allowed for shifting thereof, while also having a design which avoids failure, even when formed of relatively weak and lightweight materials, such as aluminum.

To facilitate ease of attaching and removing the clutch cable, a side loading arrangement is provided for the head of the clutch cable with this invention. This side loading into the proximal end of the clutch lever typically occurs after the clutch lever has been attached to a mounting bracket modified to accommodate side loading. This mounting bracket generally includes an attachment structure at a lower end, such as that required to facilitate the mounting bracket being mounted to a handlebar of the motorcycle. A slot is oriented within a plane above and generally aligned with the handlebar. Pivot pin holes are oriented transverse to the slot and accommodate a pivot pin about which the clutch lever pivots. A cover preferably closes off an uppermost portion of the slot of the mounting bracket, and covers the slot, with enough clearance for the clutch lever to allow the clutch lever to pivot a required distance when in use. A slit passes through the cover on a side of the mounting bracket. This slit is sized just large enough to allow the clutch cable to pass therethrough. Forward of the slit, the slit widens into an access port in the cover which is large enough to allow the head of the clutch cable to pass through this access port.

The clutch cable is preferably of a type having a head on an end thereof which has a hole passing through this head. The hole is provided so that a capture bolt or a post of some kind can secure the head to the clutch lever, and ensure that the clutch cable does not become disconnected from the clutch lever. Thus, the head of the clutch cable has a somewhat annular form.

The clutch lever includes an arm extending from the proximal end to a distal end. In one embodiment, the arm has a root closer to the proximal end which is out of alignment with portions of the arm adjacent to the distal end, with such offset in the arm provided by a recurve section at a mid-portion thereof between the root and a distal end. Such a shape for the clutch lever arm allows for a rider to conveniently have just one or two fingers passing over the arm near the distal end. Such an arm for a clutch lever is particularly desirable when the actuating force for the clutch lever can be sufficiently reduced so that it is relatively easy for a user to actuate and disengage the clutch with relatively small forces that can be easily provided with one or two fingers.

The proximal end of the clutch lever includes the pivot hole which pivots upon the pivot pin which passes through the pivot pin holes in the mounting bracket. This proximal end also supports attachment to the head of the clutch cable. For attachment of the head of the clutch cable, an anchor recess is provided above the pivot hole. This anchor recess in one embodiment has a form somewhat matching that of the head of the clutch cable, so that the anchor recess is generally filled with the head of the clutch cable.

This anchor recess includes an inner wall which is preferably planar and oriented perpendicular to a centerline of the pivot hole. A post extends perpendicularly away from the inner wall. This post preferably has a diameter similar to a hole in the donut-shaped head of the clutch cable. A threaded bore is preferably provided along a centerline of the post and extending into the post on a tip of the post opposite the inner wall. This threaded bore can accommodate a threaded shaft of a bolt which is used to capture the clutch cable to the clutch lever such as with a washer or a specially shaped cap structure.

The anchor recess has a front opening which is open to allow the clutch cable and portions of the head of the clutch cable to extend out of the anchor recess somewhat. A collar surrounds upper and lower sides of this front opening, as well as a lateral side of the front opening adjacent to the inner wall. A sidewall of the anchor recess extends perpendicularly away from the inner wall and generally parallel with a centerline of the post. The side wall extends away from the inner wall to a rim, with a distance defining a depth of the anchor recess. The side wall terminates at an access entry side of the anchor recess opposite the inner wall, through which the head of the clutch cable can pass when passing into the anchor recess and for being attached to the post within the anchor recess.

While the clutch cable and clutch lever interface could be complete as described above, when high tension forces exist between the clutch lever and the clutch cable, potential exists for the post to bend toward the front opening. In one embodiment, the anchor recess is caused to have a shape, especially for the sidewall thereof, which closely matches a size and shape of the head of the clutch cable, so that not only does the post support the head of the clutch cable, but also the side walls, especially just inboard of the collar, supports portions of the head of the clutch cable.

Furthermore, and to further reinforce the post, a post support cap is preferably provided, filling the access entry into the anchor recess and opposite the inner wall. This post support cap has a shape matching that of the anchor recess, but with a depth less than a depth of the side walls of the anchor recess, by an amount similar to a difference between a height of the side wall of the height of the head of the clutch cable. In this way, the post support cap and head of the clutch cable together in one embodiment entirely fills up the anchor recess. The post preferably has a height similar to that of the side wall, so that when the head of the clutch cable has the clutch cable head placed upon the post, and with the head of the clutch cable adjacent to the inner wall of the anchor recess, a tip of the post opposite the inner wall extends out of the hole in the head of the clutch cable, at least somewhat.

The post support cap has an interface closest to the inner wall of the anchor recess which includes a depression therein located and sized and shaped to receive the tip of the post therein when the post support cap is placed against the clutch cable head when the clutch cable head is inside of the anchor recess. This depression in the post support cap includes a floor which abuts against the tip of the post and a side surface which surrounds the tip of the post. This depression thus supports the portion of the post opposite the inner wall, and including the tip, so that the post is effectively held at each end thereof, with the first end of the post held by forming the post along with the inner wall, or otherwise fastening the post to the inner wall, and with the tip of the post supported by the depression in the post support cap.

The post support cap also includes a center hole passing therethrough which can align with the threaded bore in the post. A bolt is configured to pass through the center hole in the post support cap and then be threaded into the threaded bore. Most preferably, an outer face of the post support opposite the inner face includes a conical recess surrounding the center hole, and the bolt preferably has a tapering head with a taper angle matching that of the conical recess, such that when the tapering head is tightened it is recessed into this conical recess, at least somewhat.

Finally, the post support includes an edge wall extending between the inner face and the outer face. This edge wall has a contour of the side wall matching that of the anchor recess, including how the anchor recess has a smaller dimension adjacent to the front opening than it does adjacent to the post, so that the post support cap has a smaller width adjacent to a front portion of the edge of the inner wall than portions of the edge wall defining a maximum height of the post support. In this way, any forces applied by the clutch cable head upon the post of the clutch lever, and tending to pull the post support forward, are effectively transferred to the proximal end of the clutch lever and portions thereof adjacent to the collar and surrounding the front opening.

OBJECTS OF THE INVENTION

Accordingly, a primary object of the present invention is to provide a clutch lever which can pivot relative to motorcycle handlebars and cause actuation of a clutch, through applying tension forces to a clutch cable.

Another object of the present invention is to provide a clutch lever which decreases an amount of force required to actuate a clutch and to maintain tension on a clutch cable, such as while shifting gears while riding a motorcycle.

Another object of the present invention is to provide a clutch lever which is easy to attach and detach from a clutch cable, especially when a relatively large amount of tension is required to move the clutch lever.

Another object to the present invention is to provide a side loading clutch lever which requires less tension force to be applied (and less clutch cable travel distance) when attaching and detaching the clutch lever to a clutch cable, than other loading arrangements for attaching a clutch cable to a clutch lever.

Another object of the present invention is to provide a clutch lever which holds a donut-shaped head at an end of a clutch cable sufficiently close to a pivot point of the clutch lever that an arm on the clutch lever extending away from the pivot point can provide a greater mechanical advantage for actuation of the clutch, while still maintaining a strong and reliable attachment between the clutch lever and the clutch cable.

Another object of the present invention is to provide a clutch lever including a post for supporting a hole in a head at a distal end of a clutch cable, with the post supported at both a base and a tip for high strength characteristics of the post.

Another object to the present invention is to provide a method for simplifying the process of attaching and detaching a clutch cable to a clutch lever.

Another object of the present invention is to provide a method for actuating a clutch, using a clutch lever, which method requires less force than other clutch levers.

Other further objects of the present invention will become apparent from a careful reading of the included drawing figures, the claims and detailed description of the invention.

BRIEF DESCRIPTION OF THE DRAWINGS

FIG. 10 is a bottom plan view similar to that which is shown in FIG. 6, but with the cap removed to show details of the post and anchor recess of the clutch lever.

FIG. 11 is a left end view of the cap of FIGS. 8 and 9.

FIG. 12 is a bottom plan view of the cap of FIGS. 8 and 9.

FIG. 13 is a full sectional end view of the cap of FIGS. 8 and 9, taken along line 13-13 of FIG. 12.

DESCRIPTION OF THE PREFERRED EMBODIMENT

Figure 1:
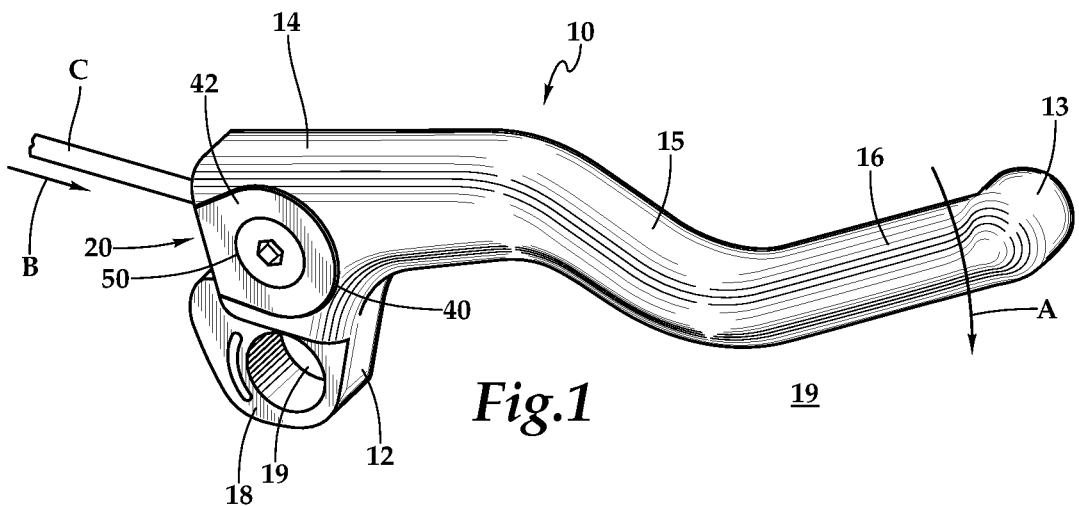
FIG. 1 is a bottom perspective view of a clutch lever for motorcycle, according to one embodiment.
Figure 2:
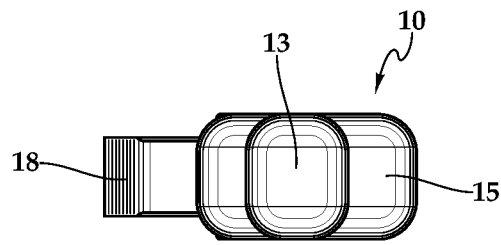
FIG. 2 is a left end elevation view of that which is shown in FIG. 1.
Figure 3:
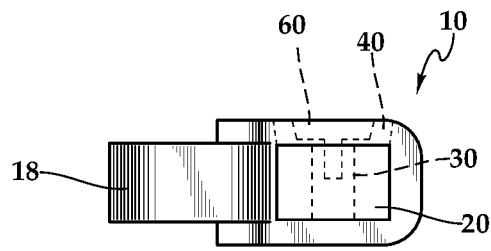
FIG. 3 is a right end elevation view of that which is shown in FIG. 1.
Figure 4:
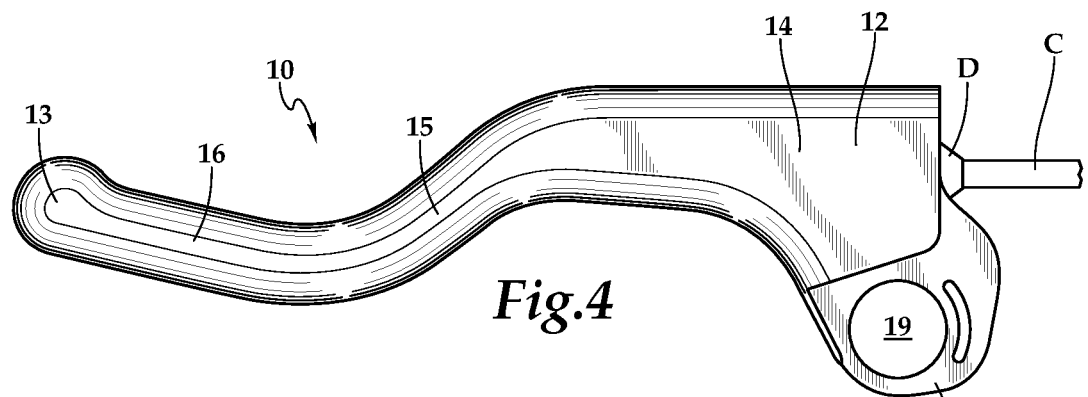
FIG. 4 is a top plan view of that which is shown in FIG. 1.
Figure 5:
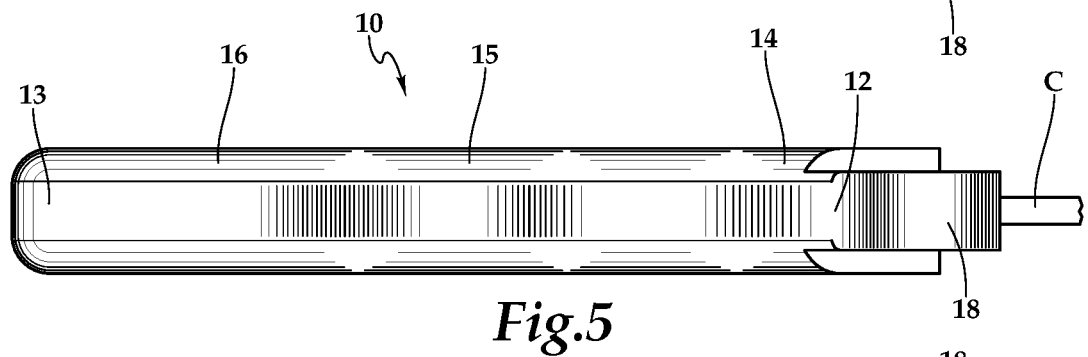
FIG. 5 is a rear elevation view of that which is shown in FIG. 1.
Figure 6:
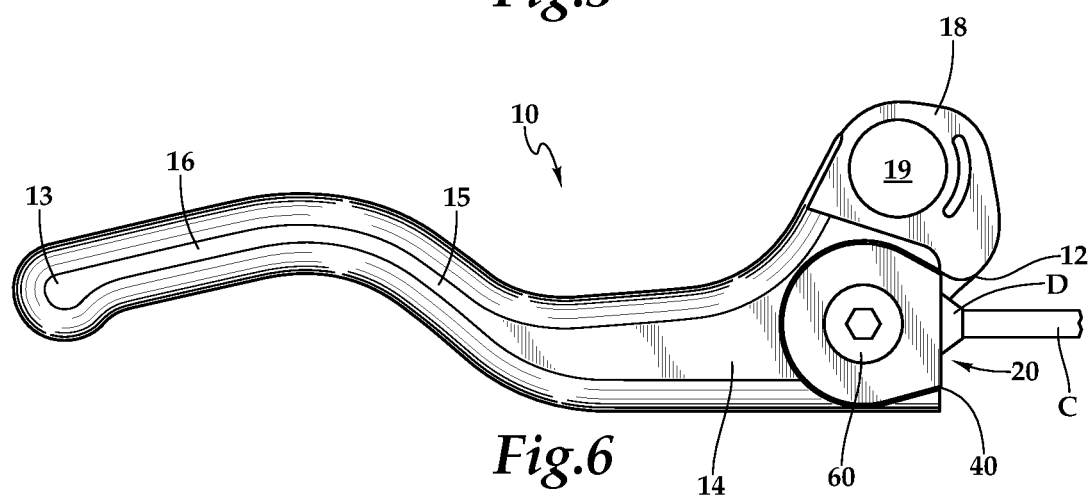
FIG. 6 is a bottom plan view of that which is shown in FIG. 1.
Figure 7:
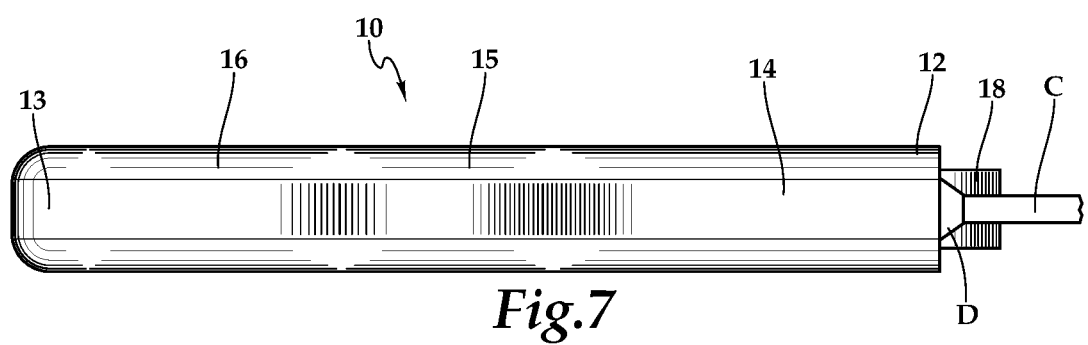
FIG. 7 is a front elevation view of that which is shown in FIG. 1.

Referring to the drawings, wherein like reference numerals represent like parts throughout the various drawing figures, reference numeral 10 is directed to a clutch lever (FIGS. 1-10) which is pivotably supported by a mounting bracket (FIG. 8) attached to a motorcycle. The clutch lever 10 is configured to securely support a clutch cable C, and particularly a head D of the cable C with a hole H in the head D supported upon a post 30 within an anchor recess 20 of the clutch lever 10. Secure and easy clutch actuation and clutch assembly/disassembly is thus facilitated.

Figure 8:
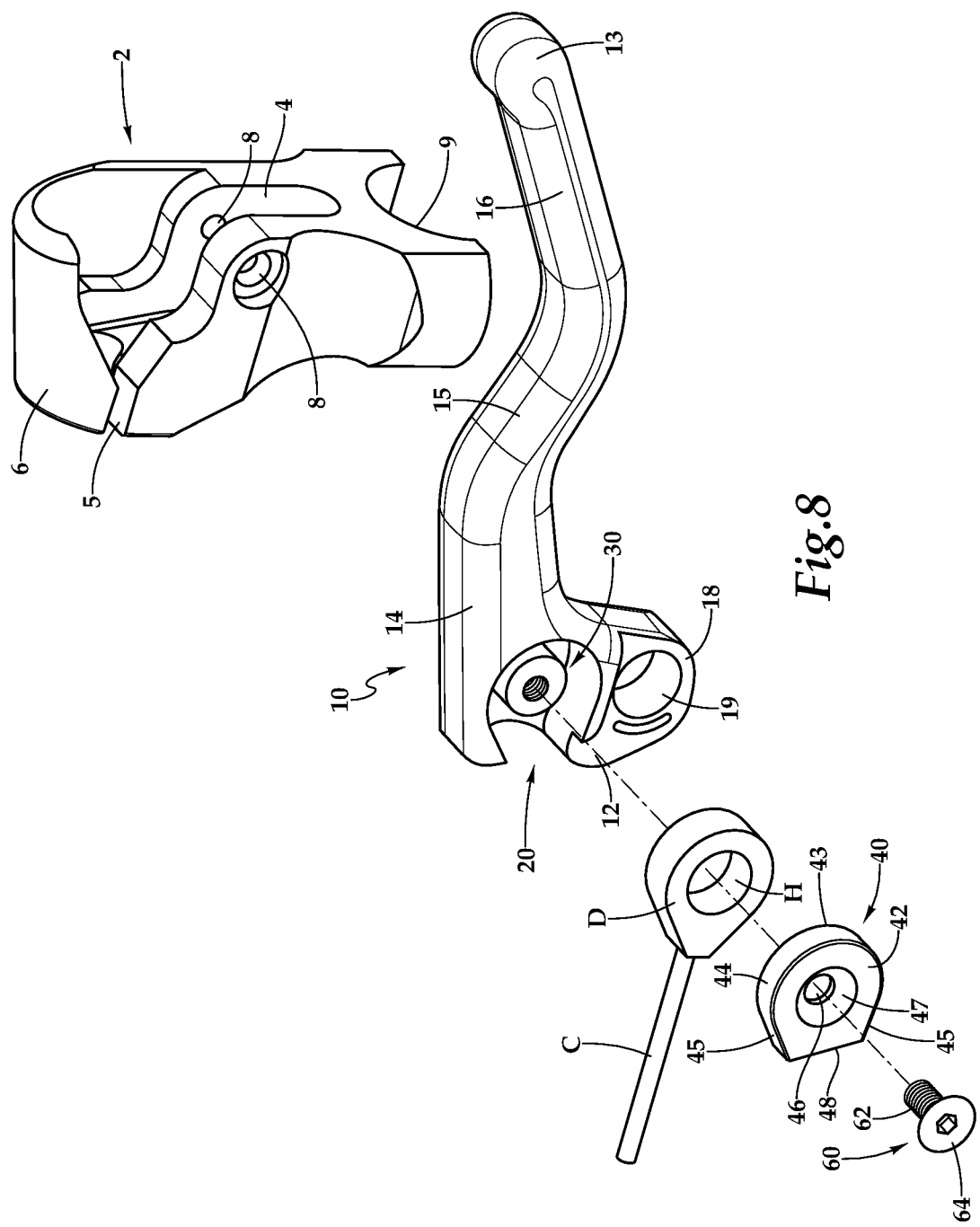
FIG. 8 is an exploded parts perspective view of a clutch lever and an adjacent mounting bracket and clutch cable incorporating the features of this invention, according to this exemplary embodiment.
Figure 9:
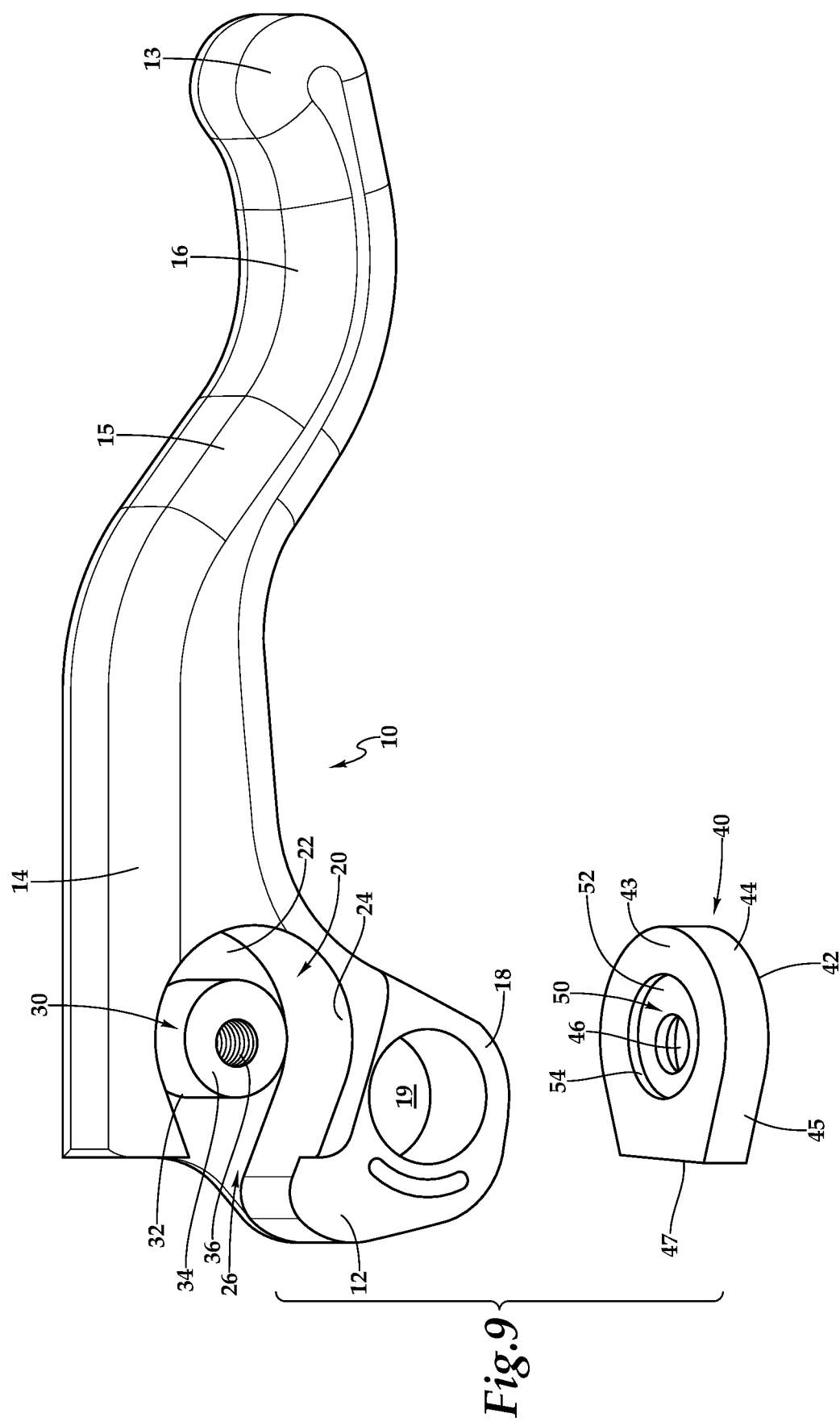
FIG. 9 is an exploded perspective view of the clutch lever of FIG. 9 with a cap associated with the clutch lever exploded away from other portions of the clutch lever and rotated, such that an inner face of the cap can be seen.

With particular reference to FIGS. 8 and 9, basic details of the clutch lever 10 and associated structures are described, according to one exemplary embodiment. The clutch lever 10 includes a proximal end 12 opposite a distal end 13. The proximal end 12 includes a collar 18 surrounding a pivot hole 19 which provides one portion of a pivot, along with pivot pin holes 8 supporting a pivot pin within the mounting bracket 2, which is secured to handlebars of the motorcycle (or other portions of the motorcycle). The proximal end 12 of the clutch lever 10 also includes an anchor recess 20 therein. The anchor recess 20 has a post 30 extending from an inner wall 22 of the anchor recess 20. The anchor recess 20 and post 30 are sized and positioned so that a hole H in a head D at a distal end of a clutch cable C can reside within the anchor recess 20 and upon the post 30, for secure holding of the clutch cable C to the clutch lever 10. A cap 40 closes the anchor recess 20. The cap 40 includes a depression 50 on an inner face 43 of the cap 40 which is sized and positioned to receive a tip 34 of the post 30 therein. The cap 40 thus supports the tip 34 of the post 30, while a base 32 of the post 30 is supported by the inner wall 22 of the anchor recess 20. With the post 30 securely supported, exceptionally high tension forces applied by the clutch cable C upon the post 30 are supported without damaging deflection of the post 30. A bolt 60 attaches the cap 40 to the post 30.

More specifically, and with particular reference to FIG. 8, details of the mounting bracket 2 are described, which pivotably supports the clutch lever 10 relative to handlebars or other structures of a motorcycle or similar vehicle. The mounting bracket 2 is preferably a monolithic structure having a relatively complex geometry, but providing the essential feature of pivotably supporting the clutch lever 10 relative to handlebars or other portions of a motorcycle or similar vehicle. In the example embodiment shown, the mounting bracket 2 includes a slot 4 defining a central cavity of the mounting bracket 2, into which a proximal end 12 of the clutch lever 10 can reside, with the clutch lever 10 being able to pivot while residing within the slot 4. A cover 6 overlies a portion of the slot 4 of the mounting bracket 2, most distant from an arcuate base 9 which abuts against portions of handlebars or other structures of the motorcycle for attachment thereto.

Pivot pin holes 8 are preferably provided between the arcuate base 9 and the cover 6. These pivot pin holes 8 support a pivot pin which can also pass through a pivot hole 19 in the proximal end 12 of the clutch lever 10. The pivot pin holes 8 are aligned with a pivot axis about which the clutch lever 10 and mounting bracket 2 pivot relative to each other.

A slit 5 passes into the slot 4 of the mounting bracket 2 from a lateral side, with the slit 5 closer to the arcuate base 9 then a distance that the cover 6 is spaced from the arcuate base 9. Many prior art clutch mounting brackets include a slit for passage of a clutch cable C located within a cover 6 portion thereof or other portion of the mounting bracket 2 most distant from an arcuate base 9 or other portion of the mounting bracket 2 which attaches to handlebars or other structures of the motorcycle or similar vehicle. However, significant tension must be applied to the clutch cable C to cause it to pass through such a top slit located in such a cover of other mounting brackets. By placing the slit 5 on the lateral side of the mounting bracket 2, less tension is required and less slack is required within the clutch cable C, to still facilitate attachment and detachment of the clutch cable C to the clutch lever 10, such as when adjusting, installing or modifying the clutch and/or clutch lever 10. The slit 5 is preferably sized just large enough to allow the clutch cable C to pass therethrough.

With particular reference to FIGS. 8-10, details of the clutch lever 10 are described, according to this disclosed embodiment. The clutch lever 10 is an elongate structure preferably form from a monolithic block of rigid material, such as aluminum or steel, either through a milling process or an additive manufacturing process, or a casting/molding process. The clutch lever 10 generally includes all portions thereof, formed together and thus rigidly coupled to each other, other than the cap 40, and the bolt 60 optionally provided to hold the cap 40 to the post 30 of the clutch lever 10. While the post 30 could conceivably be a separate part fitting within a bore in the clutch lever 10, the post 30 is most preferably formed integrally with other portions of the clutch lever 10. At a minimum, the post 30 is secured to the clutch lever 10 without appreciable relative motion therebetween.

The clutch lever 10 general includes an elongate form extending between a proximal end 12 opposite a distal end 13. A root 14 of the clutch lever 10 is adjacent to the proximal end 12, and extends away from the proximal end 12 toward the distal end 13. The root 14 transitions into a recurve 15 portion of the clutch lever 10. The recurve 15 includes a pair of curves which curve in opposite directions. The recurve 15 thus causes portions of the clutch lever 10 distal to the recurve 15 to be offset laterally relative to portions of the clutch lever 10 on a proximal side of the recurve 15, and including the root 14. These portions of the clutch lever 10 on opposite sides of the recurve 15 are close to parallel with each other, with portions distal to the recurve 15 preferably angled somewhat relative to portions of the recurve 15 closer to the proximal end 12 (as shown particularly in FIGS. 1, 4-7 and 10).

An arm 16 extends away from the recurve 15 and terminates at the distal end 13. The recurve 15 cause of the arm 16 to be closer to a rider's hand then would be the case without the recurve 15. Thus, a rider with smaller fingers can more readily wrap fingers around the arm 16 of the clutch lever 10 to apply forces thereto, than would otherwise be the case, and to facilitate toggling of the clutch lever 10 (along arrow A of FIG. 1), than would be the case without the recurve 15.

Importantly, to make it easier to apply tension forces to the clutch cable C, attachment of the clutch cable C is provided through the head D thereof to the post 30 within the anchor recess 20 at the proximal end 12 of the clutch lever 10. This post 30 is located closer to the pivot hole 19 at the proximal end 12 of the clutch lever 10, than with other prior art clutch levers. By reducing this offset distance, greater forces can be applied to the clutch cable C (along arrow B of FIG. 1) than would be the case if this offset distance was greater. However, this also puts particular strain on the post 30 of the clutch lever 10 especially, and other portions of the clutch lever 10 which interface with the cable C. As explained in detail below, the clutch lever 10 is particularly configured to withstand these greater forces, so that the benefits of being able to actuate the clutch with less force can be enjoyed, without requiring the clutch lever 10 to be formed from exotic materials or to otherwise be strengthened to avoid damage thereto.

To facilitate pivoting of the clutch lever 10 relative to the mounting bracket 2, a collar 18 is located adjacent to the proximal end 12 of the clutch lever 10. This collar 18 surrounds a pivot hole 19. The pivot hole 19 is aligned with the pivot pin holes 8 in the mounting bracket 2, and defines a pivot axis for the clutch lever 10 relative to the mounting bracket 2. A roller bearing can be fitted into this hole 19 if desired. This pivot hole 19 and collar 18 also define a second pivot half which pivots relative to a first pivot half defined by the pivot pin holes 8 and a pivot pin which would pass through these pivot pin holes 8 and along the pivot axis.

By shortening the offset distance between the pivot axis and the head D of the clutch cable C, force is applied to the clutch lever 10 at a specified offset distance away from the pivot axis, to have a greater mechanical advantage for forces applied to the clutch lever 10 closer to the distal end 13. For instance, if the offset distance is half an inch, and if the clutch lever is gripped by a finger of a user four inches away from the pivot axis toward the distal end 13 of the clutch lever 10, a mechanical advantage of eight times is provided. Thus, if the finger of the rider applies two pounds of force, sixteen pounds of force are applied to the clutch cable C. With such a significant mechanical advantage, a rider can utilize fewer fingers and lesser force to actuate the clutch. A rider can more easily utilize the clutch in a variety of different known clutch manipulation maneuvers with a minimum of strength required and exertion of effort. Furthermore, safety is enhanced in that clutch actuation maneuvers can be performed more quickly and with less fatigue then would otherwise be the case.

With continuing reference to FIGS. 8-10, details of the anchor recess 20 are described, which defines a portion of the clutch lever 10 to which the clutch cable C attaches. The anchor recess 20 is an open space generally sized similar to the head D at the distal end of the clutch cable C, but slightly larger than the head D, so that the head D can readily reside within this anchor recess 20 space. The anchor recess 20 includes the post 30 at a central portion thereof, with the post 30 sized to pass through the hole H in the head D of the clutch cable C, and with the post 30 further assisting in support of the head D at the end of the clutch cable C.

The anchor recess 20 is a generally toroidal open space between an inner wall 22 and a rim which can receive the cap 40 therein, with an inner face 43 of the cap 40 generally parallel with the inner wall 22, and with the inner wall 22 being planer, in this exemplary embodiment. A sidewall 24 extends substantially perpendicularly away from a perimeter of the inner wall 22 and defines a perimeter of the anchor recess 20. The sidewall 24 is absent at a front opening 26 of the anchor recess 20. The front opening 26 defines a location where the clutch cable C can pass, when the head D of the clutch cable C is residing within the anchor recess 20. A depth of the anchor recess 20 is generally defined by a height of the sidewall 24 extending away from the inner wall 22, minus a thickness of portions of the cap 40 which extend into the anchor recess 20.

The post 30 extends away from the inner wall 22, preferably perpendicularly, and perpendicular to a line along which the clutch cable C extends. The post 30 is sized to fit within the hole H in the head D of the clutch cable C. The post 30 is preferably cylindrical in form extending from a base 32 adjacent to the inner wall 22 and terminating at a tip 34 opposite the base 32. This tip 34 is preferably a free end of the post 30 (until it is supported by the cap 40). A tip 34 of the post 30 is preferably planar and perpendicular to side walls of the post 30, with the tip 34 of the post 30 generally oriented in a plane parallel with the inner wall 22 of the anchor recess 20.

The post 30 preferably extends away from an inner wall 22 a distance similar to a depth of the sidewall 24, but with the post 30 preferably slightly shorter, so the tip 34 is inset slightly closer to the inner wall 22 than the rim of the sidewall 24 of the anchor recess 20. A bore 36 extends into the tip 34 and is preferably threaded to receive a threaded shaft 62 of a bolt 60 extending away from a head 64 of the bolt 60 (FIG. 8). The bolt 60 holds the cap 40 to the post 30 and in position closing the anchor recess 20.

With particular reference to FIGS. 8-13, details of the cap 40 are described, according to this disclosed embodiment. The cap 40 is shaped to cover and close the anchor recess 20, other than at the front opening 26. The cap 40 includes two opposing surfaces including an outer face 42 opposite an inner face 43. These faces 42, 43 are parallel to each other in one embodiment. A perimeter of the cap 40 is defined by an edge wall 44. The edge wall 44 extends perpendicularly between the inner face 43 and the outer face 42, or can be tapered slightly (FIGS. 11 and 13), especially if the sidewall 24 of anchor recess 20 is tapered slightly, to allow the cap 40 to fit snugly within the anchor recess 20. A tight fit is provided for the cap 40 relative to the anchor recess 20, so that when the cap 40 closes off the anchor recess 20, the cap 40 is securely held in place as part of the clutch lever 10.

The edge wall 44 of the cap 40 extends forward along planar tapers 45 which terminate at the front 47. The front 47 aligns with the front opening 26 of the anchor recess 20. With the edge wall 44 and tapers 45 having a shape similar to a rim at a portion of the sidewall 24 most distant from the inner wall 22 of the anchor recess 20, the cap 40 is strongly supported and prevented from deflecting or otherwise moving relative to the anchor recess 20 and other portions of the clutch lever 10. A center hole 46 passes through the cap 40. The center hole 46 terminates at a conical recess 48 on the outer face 42 of the cap 40. This conical recess 48 can receive a similarly shaped conical head 64 of the bolt 60 passing through the central hole 46 and securing the cap 40 to the post 30.

The inner face 43 of the cap 40 preferably include a depression 50 therein. This depression 50 has a floor 52 which is preferably parallel with the inner face 43 and offset from the inner face 43 by a side surface 54 surrounding the floor 52 of the depression 50. The side surface 54 causes the depression 50 to have a size and shape matching the tip 34 of the post 30. This depression 50 is located so that when the cap 40 closes the anchor recess 20, the tip 34 of the post 30 extends into the depression 50 and is supported by the side surface 54 of the depression 50.

Most preferably, the center hole 46 is offset slightly relative to a center of the depression 50. Similarly, the bore 36 in the tip 35 the post 30 is perfectly offset by a similar distance away from a center of the tip 34 of the post 30. This offset causes portions of the tip 34 of the post 30 on one side of the bore 36 to be thicker than portions of the tip 34 of the post 30 on an opposite side of the bore 36, and further strengthens the support between the depression 50 in the inner surface 43 of the cap 40 and the tip 34 of the post 30. With the post 30 supported by the depression 50 at the tip 34 of the post 30, and with the post 30 supported at the base 32 by the anchor recess 20 in the inner wall 22 of the anchor recess 20, the post 30 is supported at each end thereof. Thus, when tension forces are applied (opposite arrow B of FIG. 1) by the clutch cable C, the post 30 is highly resistant to deflection. This allows the post 30 to be closer to the pivot axis of the clutch lever 10 than would otherwise be the case for a similarly sized post formed of a similar material.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When embodiments are referred to as "exemplary" or "preferred" this term is meant to indicate one example of the invention, and does not exclude other possible embodiments. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A motorcycle clutch lever, comprising in combination:
  a proximal end and a distal end opposite said proximal end, with an arm extending between the proximal end and the distal end;
  a pivot at the proximal end about which the clutch lever pivots;
  an anchor recess sized to hold a clutch cable head therein, said anchor recess located at said proximal end and located an offset distance away from said pivot;
  said anchor recess including a post therein, said post extending from an inner wall of said anchor recess on a lateral side of said anchor recess, said post sized at least as small as a hole in the head of the clutch cable; and
  a post support cap sized to fit within said anchor recess at least partially, said post support cap including a depression in an inner face of said post support cap on a side of said post support cap closest to said inner wall of said anchor recess, said depression supporting said post at a tip of said post, opposite said inner wall, to resist post movement relative to said inner wall when tension forces are applied to said post by the head of the clutch cable.

2. The clutch lever of claim 1 wherein a recurve section is provided in said arm between said proximal end and said distal end of the clutch lever.

3. The clutch lever of claim 1 wherein said anchor recess includes a front opening surrounded on at least three sides thereof by a collar, said front opening smaller than a cross-section of said anchor recess adjacent to said post, and with said post support cap sized larger than said front opening.

4. The clutch lever of claim 1 wherein said post has a circular cross-section and wherein said depression fits on said post, by having a circular cross-section similar to that present at a tip of said post opposite side inner wall of said anchor recess.

5. The clutch lever of claim 4 wherein said post support cap includes a central hole aligned with a threaded bore in said tip of said post, and with a bolt passing through said center hole and into said threaded bore of said post, with tightening of said bolt causing said post support cap to be secured to said post.

6. A clutch lever and mounting bracket for a motorcycle, comprising in combination:
   a mounting bracket on the motorcycle and adjacent to handlebars of the motorcycle;
   said mounting bracket including a first pivot half;
   a clutch lever of elongate form between a proximal end and a distal end, with an arm extending at least partially between said proximal end and said distal end;
   a second pivot half at said proximal end of said clutch lever, said second pivot half adapted to pivot relative to said first pivot half of said mounting bracket;
   a post on said clutch lever, said post offset from said second pivot half of said clutch lever by an offset distance;
   said post sized to fit within a hole in a head secured to an end of a clutch cable; and
   wherein said post is located within an anchor recess within said clutch lever, said anchor recess having a front opening through which said clutch cable extends.

7. The combination of claim 6 wherein a slit is formed in a side of said mounting bracket, said slit sized large enough to allow said clutch cable to pass through said slit.

8. The combination of claim 7 wherein said slit is located on a side of said mounting bracket adjacent to a cover of said mounting bracket most distant from said first pivot half, said slit located closer to said first pivot half than a distance by which said cover is spaced from said first pivot half.

9. The combination of claim 6 wherein said anchor recess includes an inner wall oriented in a plane parallel with said clutch cable passing through said front opening of said anchor recess, said post oriented perpendicular to said inner wall and extending from said inner wall through a base of said post.

10. The combination of claim 9 wherein said post extends from said base to a tip opposite said base.

11. The combination of claim 10 wherein said anchor recess is narrower at said front opening of said anchor recess than other portions of said anchor recess spaced from said front opening and on a distal side of said front opening.

12. The combination of claim 11 wherein a cap is located at least partially within said anchor recess, within a portion of said anchor recess opposite said inner wall of said anchor recess.

13. The combination of claim 12 wherein said cap includes a depression in an inner face of said cap, said depression sized to receive and support said tip of said post within said depression of said cap.

14. The combination of claim 13 wherein a bore extends into said tip of said post, said cap including a hole passing therethrough, said hole in said cap aligned with said bore in said post, such that a fastener can pass through said hole in said cap and extend into said bore and said post to secure said cap to said post.

15. The combination of claim 14 wherein said bore and said hole are offset from a center of said post and a center of said depression and said inner face of said cap.

16. The combination of claim 12 wherein said cap includes a side wall which tapers between an outer face of said cap and an inner face of said cap, such that said inner face is slightly larger than said inner face, and wherein said anchor recess includes a side wall which tapers slightly to cause said side wall of said anchor recess to be slightly smaller at said inner wall than portions of said anchor recess spaced from said inner wall.

17. The combination of claim 12 wherein said cap has an edge wall which tapers adjacent to a front of said cap, said tapers and said edge wall of said cap having a size and shape which match a contour of portions of said anchor recess spaced from said inner wall and adjacent to said tip of said post.

18. The combination of claim 6 wherein said post is parallel with a pivot axis of said first pivot and said second pivot.

19. The combination of claim 6 wherein said clutch lever extends between said proximal end and said distal end from a root transitioning into a recurve section, before terminating at said distal end.

* * * * *